W. H. Lock,
Revolving Rake.
No. 113,899.   Patented Apr. 18, 1871.
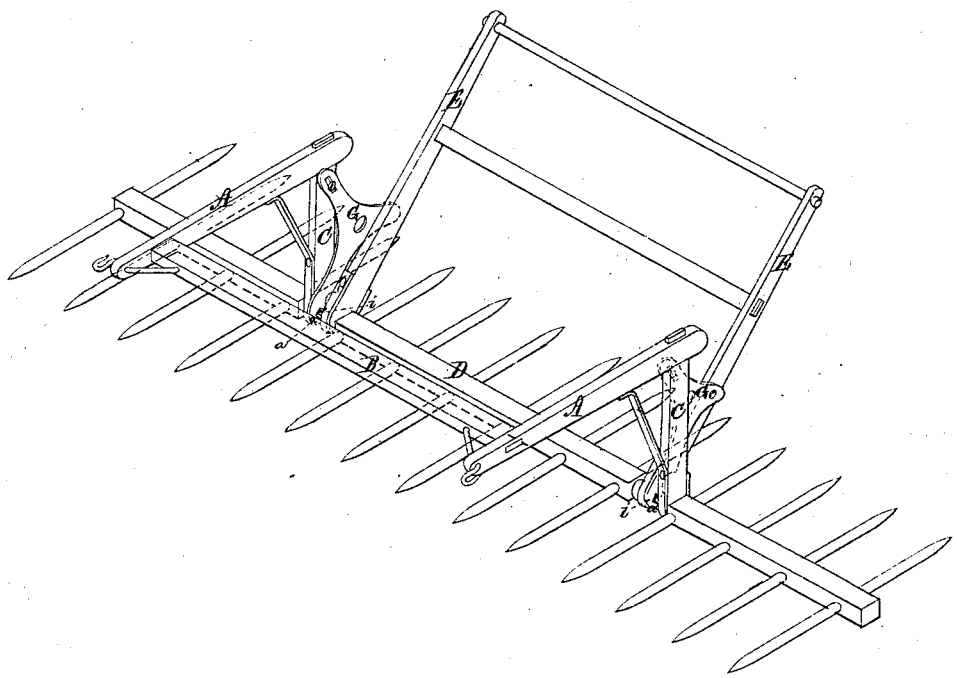
Witnesses
John A. Ellis.
Jas. V. White
Inventor
Wm. H. Lock,
Per
J. H. Alexander
Atty

United States Patent Office.

WILLIAM H. LOCKE, OF CANTON, PENNSYLVANIA.

Letters Patent No. 113,899, dated April 18, 1871.

IMPROVEMENT IN HORSE HAY-RAKES.

The Schedule referred to in these Letters Patent and making part of the same.

*To all whom it may concern:*

Be it known that I, WILLIAM H. LOCKE, of Canton, in the county of Bradford and State of Pennsylvania, have invented certain new and useful Improvements in Horse Hay-Rakes; and I do hereby declare that the following is a full, clear, and exact description thereof, reference being had to the accompanying drawing and to the letters of reference marked thereon which form a part of this specification.

The nature of my invention consists in the construction and arrangement of a revolving hay-rake in which the handles and standards for the shafts are connected together and locked to the head of the rake, as will be hereinafter more fully set forth.

In order to enable others skilled in the art to which my invention appertains to make and use the same, I will now proceed to describe its construction and operation, referring to the annexed drawing, in which is represented a perspective view of my hay-rake.

A A represent the two shafts, connected by a cross-bar, B.

From the rear end of each shaft A a post or bar, C, extends at right angles downward, and suitably braced to the shaft.

The rake D is placed and revolves in loops or boxes at the lower ends of said bars C C, and the handles E E have also loops at their lower ends around the rake-head, one handle being placed on the inner side of each bar C, as shown.

Upon the outer side of each handle E is pivoted a triangular lever, G, one arm of which extends upward and forward and has a slot through which a screw or bolt passes into the bar C, thus connecting the standards for the shafts and handles together.

Another arm of each lever G extends downward and forward, and has a hook, a, formed on its end, which catches on pins i in the rake head, between the loops on the bars and handles, thus locking the standards for the shafts and handles to the rake-head.

The levers G G thus not only connect the standards for the shafts and handles, but also lock them to the head and hold them in their proper position till the load is to be discharged, when, by raising the handles sufficient to bring the ends of the shafts below the line of draft, the levers will unlock from the head and allow it to revolve, and when the ends of the shafts are raised again the levers lock them to the head.

These levers may be used in connection with framed handles, as shown in the drawing, or in connection with a single handle in the center of head and connecting-shafts by means of a rod attached to the center of the cross-bar B, and running to and connecting with the lever at the upper end.

Having thus fully described my invention,

What I claim as new, and desire to secure by Letters Patent, is—

1. The triangular lever G pivoted to the handle E, and having a slot in one arm for connecting with the standards for the shafts, and a hook, a, in another arm to lock on the pins i in the rake-head, substantially as herein set forth.

2. The combination of the shafts A A, rake D, handles E E, and levers G G, all constructed and arranged to operate substantially as and for the purposes herein set forth.

In testimony that I claim the foregoing as my own I affix my signature in presence of two witnesses.

WM. H. LOCKE.

Witnesses:
    D. W. WHITE,
    J. A. McNAUGHT.